June 19, 1923. Re. 15,631

W. O'NEIL

MANUFACTURE OF CORD TIRES

Original Filed Dec. 2, 1920

Inventor
William O'Neil.
By
Thurston Kurz & Hudson
attys.

Reissued June 19, 1923. Re. 15,631

UNITED STATES PATENT OFFICE.

WILLIAM O'NEIL, OF AKRON, OHIO, ASSIGNOR TO THE GENERAL TIRE & RUBBER COMPANY, OF AKRON, OHIO, A CORPORATION OF OHIO.

MANUFACTURE OF CORD TIRES.

Original No. 1,437,859, dated December 5, 1922, Serial No. 427,676, filed December 2, 1920. Application for reissue filed April 11, 1923. Serial No. 631,478.

*To all whom it may concern:*

Be it known that I, WILLIAM O'NEIL, a citizen of the United States, residing at Akron, in the county of Summit and State of Ohio, have invented a certain new and useful Improvement in the Manufacture of Cord Tires, of which the following is a full, clear, and exact description.

The object of this invention is to make cord tires which will cost less and last longer than cord tires as they have heretofore been made.

Cord tires are built up of a plurality of superimposed layers of bias cut frictioned cord fabric. In some of the layers the cords extend diagonally in one direction and in others the cords extend diagonally in the opposite direction. Generally the alternate layers have the cords running diagonally in one direction while the intermediate layers have the cords running diagonally in the opposite direction.

The raw rubber with which the several layers of fabric are coated stock the layers together as they are being formed and superimposed upon an annular core; and after the so constructed tires have been vulcanized the union between the layers has a high degree of permanency. Nevertheless it is very common for cord tires when put to use to deteriorate as the result of the separation of the superimposed layers of fabric.

The present invention is based upon the appreciation of the fact that said separation of the layers or plies is principally due to the presence in the friction fabric of alternating thick and thin zones,—the thick zone being due to the deflection of the warp cords up and down by woven in fine filler threads which pass over alternate warp cords, and under the intermediate warp cords. It is also based upon the discovery that, by using a properly constructed fabric, the thick and thin zones therein may be eradicated, and a frictioned fabric produced which is of uniform thickness throughout.

The invention consists in a frictioned fabric which is of uniform thickness throughout, and in which the warp cords are entirely surrounded by a substantial coating of raw rubber. And it further consists in the method of producing such new fabric, and also in a cord tire made from such fabric.

Figure 1:
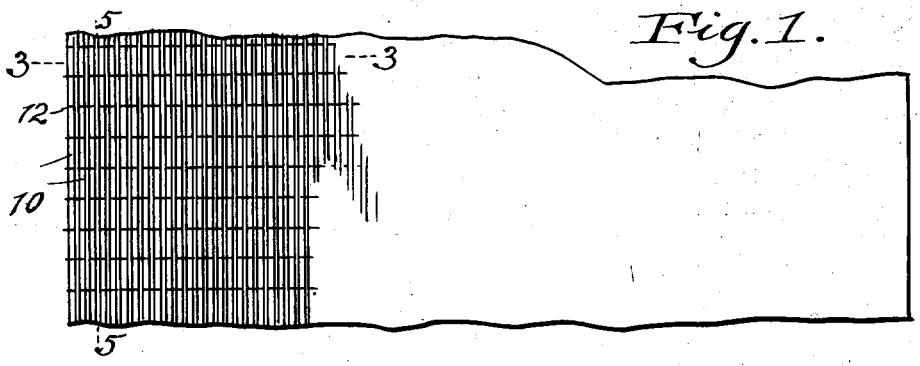
Figure 2:
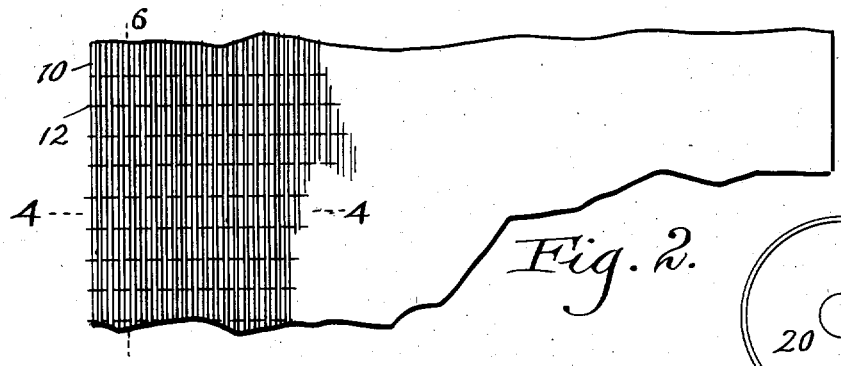
Figure 3:
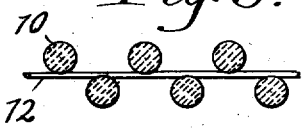
Figure 4:
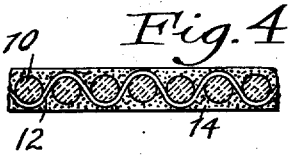
Figure 7:
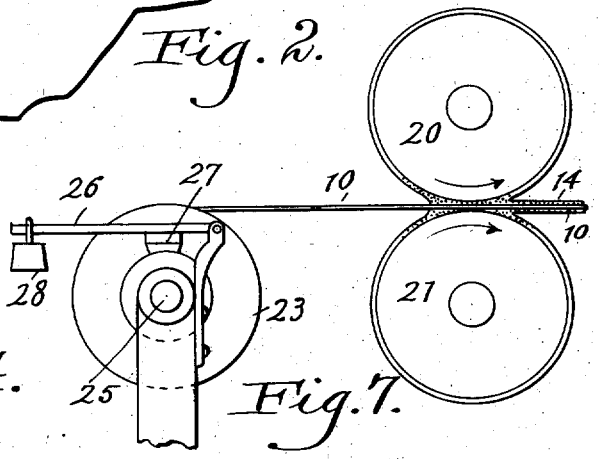
Figure 5:
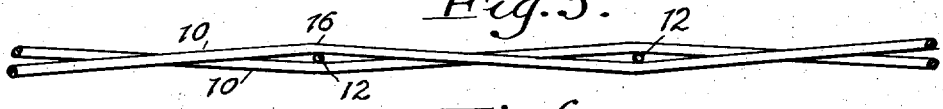
Figure 6:
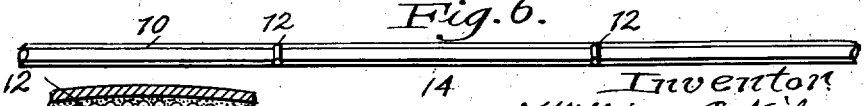
Figure 8:
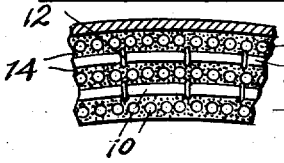

All of which will be hereinafter described and definitely set forth in the appended claims, and is illustrated in the accompanying drawings, in which Fig. 1 is an enlarged plan view of a piece of unfrictioned fabric which is used in the production of the frictioned fabric which constitutes the new article of manufacture herein described and claimed; Fig. 2 is an enlarged plan view of a piece of finished frictioned fabric; Fig. 3 is a magnified transverse section in the plane indicated by line 3—3 on Fig. 1 of the fabric shown in that figure; Fig. 4 is a magnified transverse section on line 4—4 of Fig. 2 of a part of the fabric shown in that figure; Fig. 5 is a magnified longitudinal section in the plane of line 5—5 on Fig. 1 of the fabric shown in that figure; Fig. 6 is a magnified view in the plane of line 6—6 on Fig. 2 of the finished fabric shown therein; Fig. 7 is a side elevation somewhat diagrammatic in character of the means employed for producing the fabric illustrated in Figs. 2, 4 and 6; Fig. 8 is a magnified fragmentary section of a cord tire which embodies the present invention, the section being a diagonal section which is parallel with the warp cords of alternate layers.

The warp cords are indicated by 10 and the fine woven in filler threads by 12. In the finished fabric the warp cords all lie side by side in the same plane, as shown in Figs. 4 and 6, but they are not in contact. The spaces between the warp cords are packed full of raw rubber compound 13, and a coating 14 of this rubber compound is spread over both faces of the fabric, the rubber layers between the warp cords and the rubber coatings on both faces thereof being of substantial and appreciable thickness. The transverse filler threads 12 are waved up and down as they pass over and under alternate warp cords without deflecting said warp cords above or below the plane in which they are shown.

To produce this fabric one takes as the base thereof a woven fabric such as is shown in Figs. 1, 3 and 5, which fabric comprises a multitude of warp cords 10 and sparsely placed woven in filler threads 12 which are substantially straight, each passing over alternate warp cords, which are thereby deflected downward, and under intermediate warp cords, which are thereby deflected upward.

Each filler thread therefore creates a thick transverse zone 16 across the fabric, said fabric at said zones being nearly twice as thick as the fabric is midway between the zones where the warp cords cross each other.

One essential characteristic of this base fabric is that the warp cords shall not be in substantial contact but shall be located so far apart that when, as hereinafter described, the waves are entirely pulled out of the warp cords and the fabric is narrowed by the resultant bending of the filler threads and the consequent lateral movement of the warp cords toward each other, these warp cords will not come into substantial contact.

In fact, this invention is based upon the use of this fabric instead of the old base fabric which has heretofore been used, said old fabric having a greater number of warp cords and said warp cords being in substantial contact before the fabric is subjected to any frictioning process steps.

The fabric shown in Figs. 1, 3 and 5 is then made to pass between calendar rolls 20, 21, which are covered with raw rubber compound. In fact, the fabric is drawn along lengthwise by the action of said rolls which pull the fabric from a roll 23 thereof against a very substantial tension which may be applied to a brake drum 24 fixed to an arbor 25 on which the fabric is rolled. The brake may include a pivoted lever 26 having a brake engaging shoe 27 and the brake pressure may be regulated by a weight 28 hanging on said lever. It is to be understood, however, that this braking mechanism is merely illustrative and that any means may be employed to so hold back the fabric that the rolls may by pulling the fabric straighten the waves out of the warp cords. The straightening of the warp cords and the elimination of the waves therein necessarily causes the filler threads to bend up and down, and as the filled threads are so caused to bend, the warp threads of necessity move laterally toward each other. But as stated, said warp cords are originally so far apart that when they have moved laterally to the extent necessary to allow the filler threads to take all of the bends required to allow the warp cords to be straight, said warp cords will not be in substantial contact. The rolls 20, 21, not only straighten out the warp cords as stated, and correspondingly narrow the fabric but they also, while the parts of the fabric are in the condition stated, apply to opposite faces of the fabric the layers of rubber compound, and they squeeze this compound into the interstices between the warp cords so as to entirely fill the same. When the fabric emerges from the opposite side of the rolls, the rubber compound so applied will hold the various parts of the fabric in the relative positions stated, that is to say, it will prevent the warp cords from again taking on the waves which they originally had, and will prevent a widening of the fabric and a consequent straightening of the filler threads. The fabric so produced is of uniform thickness throughout, and is utterly devoid of the thick and thin zones which are characteristic of the frictioned cord fabric which has heretofore been used in the manufacture of cord tires.

I am aware that the base fabric which has heretofore been used has been frictioned by the means above described, that is, the fabric has been pulled along through calendar rolls by which the rubber compound is applied to opposite faces thereof. I am aware also that a certain amount of tension has been put upon the fabric as the rolls are pulling it along, but this tension has had for its sole purpose the keeping of the fabric straight. Moreover, the old fabric has been constructed as before stated with its warp cords in substantial contact. Therefore, however strong may have been the pull applied to this fabric to draw it through the rubber applying calendar rolls, the waves in the warp cords could not be straightened out. This is because the straightening of the warp cords necessarily involves the crimping of the filler threads and the consequent lateral movement of the warp cords toward each other. Only a very slight degree of lateral movement of the warp cords relative to each other is possible in the old fabric because after a very slight movement in the direction stated, these warp cords are so crowded into contact with each other that further movement is impossible. This limit is reached long before there is substantial or appreciable straightening of the warp cords.

The fact that the warp cords are so crowded together makes it practically impossible for the calendar rolls to crowd the rubber compound between them, and therefore in using the old fabric a preliminary step has been necessary, which step is entirely unnecessary when one employs the fabric in which the warp cords are separated a substantial distance, as hereinbefore explained.

In the manufacture of cord tires from the old fabric it is common practice to run them through a rubber solution by which all of the cords are completely wet. When the fabric, after it has come out of that solution, is dried, each of the warp cords is entirely enveloped by the very minute film of rubber. This is thinner than is desirable, but it is better to have this very thin film of rubber surrounding the cord than to have at frequent intervals no rubber at all between the cords, as is the case if the old time fabric is not subjected to this preliminary treatment, and if the attempt be made to apply the rubber coating thereto by means of the calendar rolls alone.

In other words, the present invention cheapens the construction of cord tires by permitting the omission of one process step which has heretofore been found necessary in producing a friction fabric. Additionally, the new fabric herein described being of uniform thickness throughout, and having a substantial layer of rubber between the warp cords will produce tires in which the layers have less tendency to separate when the tires are in use than is the case with the tires heretofore made.

It is perhaps desirable to more specifically describe a base fabric which can be successfully used to produce frictioned cord fabric, and tires therefrom according to the present invention. And this can perhaps be best done by making comparison between such fabric and the fabric which has heretofore been used for that purpose.

A cord fabric which is in common use for the stated purpose is woven with 26 warp cords to the inch and with 2½ fine filler threads to the inch. The warp cords, however, are of such diameter that they are in substantial contact when the fabric leaves the loom. The filler threads moreover are placed as far apart as they can be and yet serve the purpose for which they are used, namely, to hold the warp cords in the desired relation to each other. They would better serve their purpose if more of them were used, but since each filler thread used produces a thick zone in the finished fabric there are as few of these used as is possible.

A woven cord fabric which is adapted for use in the practice of the present invention may be made up of warp cords of the same diameter as those used in the old fabric, and may be woven with eighteen of such cords to the inch. Five or six filler threads may be woven in per inch,—this increased number being desirable for reasons stated and being without injurious effect because they do not produce, in the finished product, any thick zones.

It is to be understood that I do not intend by the foregoing statement to limit this invention to the use of a fabric having the particular number of warp cords per inch stated. The essential characteristic of the fabric used is that the warp cords shall be woven at such a distance apart as that, when all of the waves have been pulled out of them, they will not, by the resultant narrowing of the fabric, be brought into actual contact. It might be added that cord tires made from the described fabric, having 18 cords to the inch, have been found to be not only more durable than tires made from the old fabric, but sufficiently strong to stand up under the internal air pressure to which they are subjected in use.

Having described my invention, I claim:

1. The process of preparing frictioned cord fabric adapted for use in the manufacture of cord tires which consists in treating in the manner hereinafter described a cord fabric comprising a multitude of warp cords and woven in fine filler threads, said warp cords being at such a distance apart as will permit them to move laterally, without coming into contact, to the extent to which they must move when the warp cords are completely straightened and the filler threads are consequently crimped, said treatment consisting in stretching the fabric lengthwise until all of the warp cords are straightened and all of the filler threads are made to bend up and down as they pass over and under alternate warp cords without deflecting said warp cords, and in forcing raw rubber onto both faces of the fabric and into the interstices between the warp cords while the various parts of the fabric are in the condition stated.

2. The process of preparing frictioned cord fabric for use in the manufacture of cord tires, which consists in drawing said fabric lengthwise by means of calendar rolls between which the fabric passes, in utilizing said rolls to apply raw rubber to both faces of the fabric and force said raw rubber into the spaces between the warp cords and in applying to the fabric as it is being pulled along by said calendar rolls such a degree of tension as will completely straighten out all of the waves in the warp cords, and produce a frictional fabric of uniform thickness throughout.

3. A friction cord fabric adapted for use in the manufacture of cord tires, said fabric being of substantially uniform thickness throughout, and comprising a multitude of parallel warp cords, all of which at all places lie in substantially the same plane but out of contact with one another, and a plurality of woven in fuller threads each of which is waved so as to pass alternately over and under the warp cords without deflecting them, said fabric being coated with raw rubber on both surfaces, and the warp cords being separated from each other by raw rubber which fills the interstices between them.

In testimony whereof, I hereunto affix my signature.

WILLIAM O'NEIL.